(12) United States Patent
Jung et al.

(10) Patent No.: US 8,834,176 B2
(45) Date of Patent: Sep. 16, 2014

(54) METHOD AND SYSTEM FOR PLANT MANAGEMENT BY AUGMENTATION REALITY

(75) Inventors: Ji Eun Jung, Seongnam-si (KR); Byung Hun Song, Namyangju-si (KR)

(73) Assignee: Korea Electronics Technology Institute, Seongnam-Si, Gyeonggi-Do (KR)

( * ) Notice: Subject to any disclaimer, the term of this patent is extended or adjusted under 35 U.S.C. 154(b) by 0 days.

(21) Appl. No.: 13/336,716

(22) Filed: Dec. 23, 2011

(65) Prior Publication Data

US 2012/0251996 A1 Oct. 4, 2012

(30) Foreign Application Priority Data

Mar. 31, 2011 (KR) ........................ 10-2011-0029484

(51) Int. Cl.
*G05B 19/418* (2006.01)

(52) U.S. Cl.
CPC .. *G05B 19/4183* (2013.01); *G05B 2219/32014* (2013.01)
USPC .......................................... 434/365; 345/633

(58) Field of Classification Search
CPC ......... G09B 19/00; G09B 7/00; G06T 19/006
USPC ............................ 434/365, 218, 219; 345/633
See application file for complete search history.

(56) References Cited

U.S. PATENT DOCUMENTS

| | | | | |
|---|---|---|---|---|
| 5,689,233 A * | 11/1997 | Kurisu et al. | .................. | 340/506 |
| 5,817,958 A * | 10/1998 | Uchida et al. | ................. | 73/865.9 |
| 6,244,015 B1 * | 6/2001 | Ito et al. | ........................ | 52/741.1 |
| 6,880,128 B2 * | 4/2005 | Nguyen | ........................ | 715/744 |
| 2004/0227739 A1 * | 11/2004 | Tani et al. | ...................... | 345/173 |
| 2007/0296575 A1 * | 12/2007 | Eisold et al. | ............. | 340/539.16 |
| 2009/0231436 A1 * | 9/2009 | Faltesek et al. | ............... | 348/169 |
| 2009/0319058 A1 * | 12/2009 | Rovaglio et al. | ................. | 700/17 |
| 2011/0161239 A1 * | 6/2011 | Muehlmeier et al. | ......... | 705/324 |

OTHER PUBLICATIONS

Chang Hwan Kim; A Development of Automated Pipe Spool Installation Management Process Based on Mobile Augmented Reality for Plant Construction; Civil, Architectural and Engineering; Oct. 2010; 56 pages; Sungkyunkwan University.
Korean Office Action for Korean Patent Application No. 10-2011-0029484 mailed Aug. 24, 2012 from KIPO, citing the above reference(s).

* cited by examiner

*Primary Examiner* — Sam Yao
*Assistant Examiner* — Thomas Hong
(74) *Attorney, Agent, or Firm* — Lowe Hauptman & Ham, LLP

(57) ABSTRACT

A plant management method using augmentation reality is provided. A method for providing a plant management screen overlaps and displays a real image of facilities in the plant and a virtual image indicating a facility to check. Hence, by displaying the facilities in the plant using the augmentation reality, the facility inspector can detect and access the facility having a problem more easily.

8 Claims, 11 Drawing Sheets

METHOD AND SYSTEM FOR PLANT MANAGEMENT BY AUGMENTATION REALITY

PRIORITY

The present application claims the benefit under 35 U.S.C. §119(a) to a Korean patent application filed in the Korean Intellectual Property Office on Mar. 31, 2011, and assigned Serial No. 10-2011-0029484. the entire disclosure of which is hereby incorporated by reference.

TECHNICAL FIELD OF THE INVENTION

The present invention relates generally to a method and a system for plant management. More particularly, the present invention relates to a method and a system for plant management for monitoring and dealing with a problem in facilities in a plant.

BACKGROUND OF THE INVENTION

Since a plant industry includes high heat and high pressure processes, when a serious accident such as fire or explosion occurs, the scale of the damage is extremely great. Thus, the plant industry is classified as a high-risk industry.

Hence, plant makers actively adopt a method for consistently monitoring various risk factors caused in the plant by attaching security sensors (e.g., pressure, leakage, and vibration sensors) to main facilities.

However, although the safety sensors collect the massive plant state information as stated above, there is no application system for rapidly and effectively showing the information. Accordingly, a manager has difficulty in efficiently determining and managing the operation condition per process.

SUMMARY OF THE INVENTION

To address the above-discussed deficiencies of the prior art, it is a primary aspect of the present invention to provide a method for providing a plant management screen to easily locate facilities in a plant using augmentation reality.

According to one aspect of the present invention, a method for providing a plant management screen includes photographing facilities in a plant; overlapping a virtual image indicating a facility to check and a real image captured in the photographing operation; and displaying the real image with the virtual image overlapped.

The overlapping operation may include measuring a current location; obtaining information of the facilities to check around the current location measured in the measuring operation; generating the virtual image based on the information of the facilities to check measured in the obtaining operation; and overlapping the virtual image generated in the generating operation and the real image.

The virtual image may differently represent the facility to check according to a type.

The virtual image may represent a facility to having a problem to check differently from a facility having no problem.

The method may further include displaying a measure command required for the problem.

The method may further include inputting measure details for the measure command; and transmitting the measure details input in the inputting operation.

The facility to check may be a sensor.

According to another aspect of the present invention, a computer-readable recoding medium contains a program for executing a method for providing a plant management screen, the method comprising photographing facilities in a plant, overlapping a virtual image indicating a facility to check and a real image captured in the photographing operation, and displaying the real image with the virtual image overlapped.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents.

Figure 1:
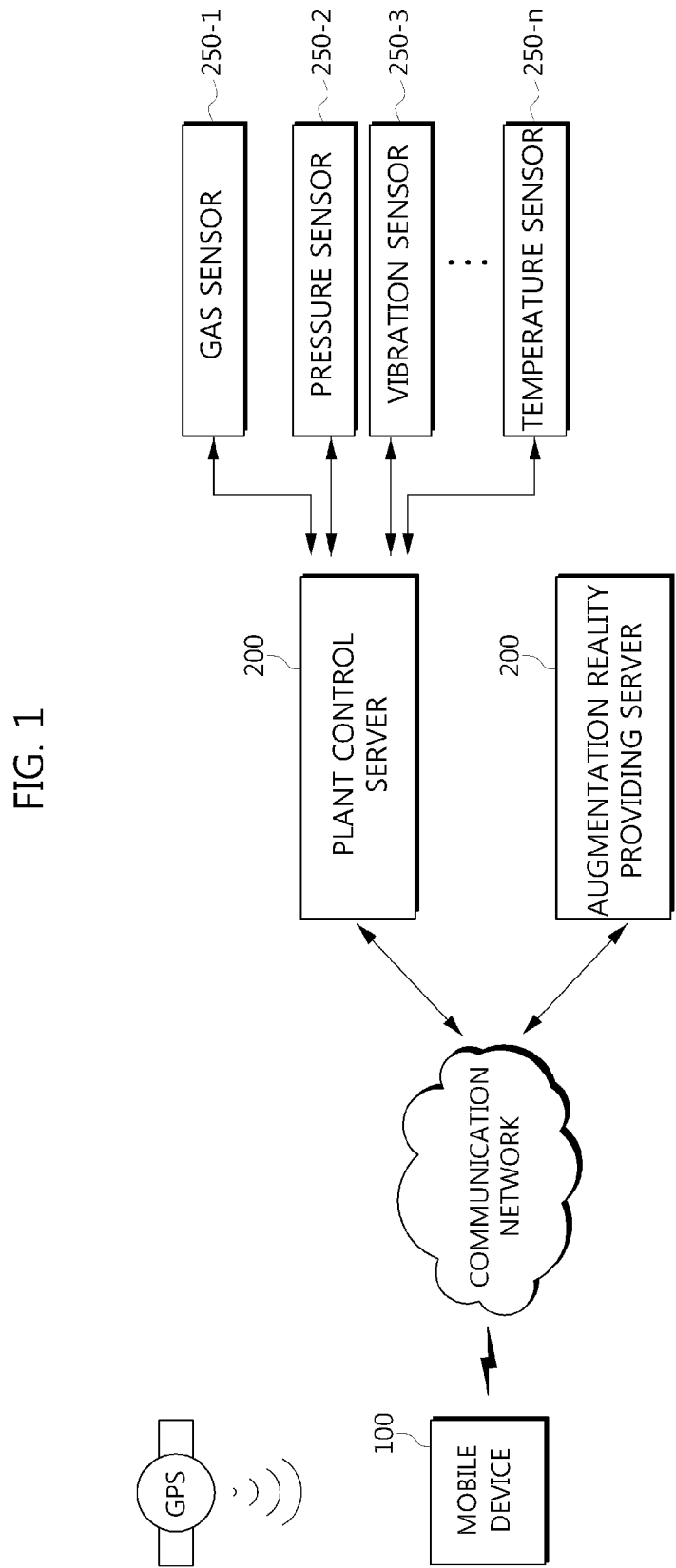
FIG. 1 is a diagram of a plant facility management system to which the present invention is applicable.

FIG. 1 is a diagram of a plant facility management system to which the present invention is applicable. As shown in FIG. 1, in the plant facility management system, a mobile device 100, a plant control server 200, and an augmentation reality providing server 300 are communicatively connected via a communication network.

The communication network includes various wired communication networks and wireless communication networks such as Internet, intranet, mobile communication network, and satellite communication network.

The mobile device 100 installs and executes a plant facility management application, and is a device such as smart phone and table PC, capable of supporting an augmentation reality service.

The plant facility management application is an application used to guide locations of sensors 250-1 through 250-n installed in the plant using the augmentation reality, and to provide the locations together with detailed information of the sensors 250-1 through 250-n.

The plant control server 200 monitors state of the plant facilities through the sensors 250-1 through 250-n. When determining a problem such as accident during the monitoring, the plant control server 200 sends an accident measure plan to the mobile device 100.

The augmentation reality providing server 300 obtains information of the locations, the detailed information, and a check list of the sensors 250-1 through 250-n from the plant control server 200, stores the information in a DB, and sends the information stored in the DB to the mobile device 100.

Figure 2:
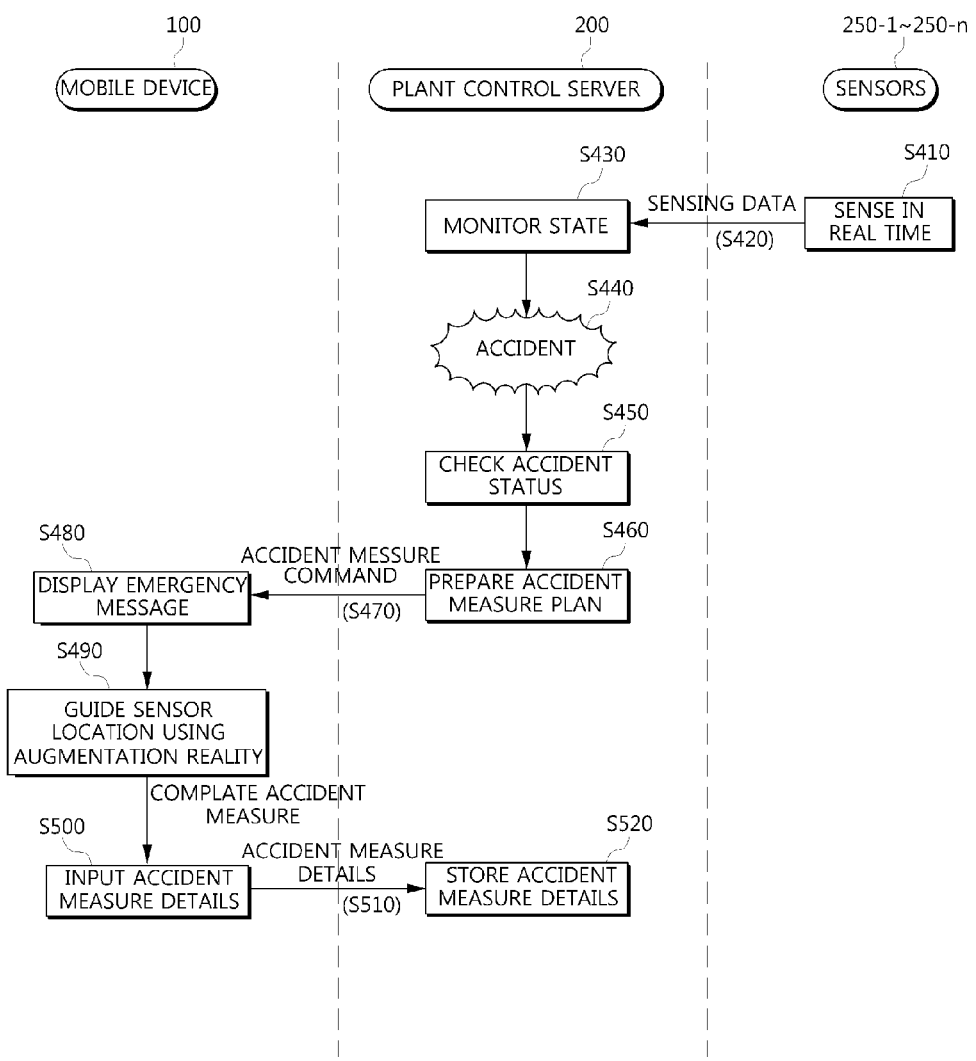
FIG. 2 is a diagram of a plant facility management method according to an exemplary embodiment of the present invention.

Hereafter, a scenario for managing the plant facilities through the plant facility management system of FIG. 1 is explained in detail by referring to FIG. 2. FIG. 2 is a diagram of a plant facility management method according to an exemplary embodiment of the present invention.

The sensing data generated by the sensors 250-1 through 250-n by sensing in real time (S410) is transmitted to the plant control server 200 (S420). The plant control server 200 monitors the state of the facilities in the plant with the sensing data received in S420 (S430).

When determining an accident during the monitoring (S440), the manager checks whether the accident really takes place through a CCTV (S450) and establishes the accident measure plan (S460).

The accident takes place when the sensing data value exceeds a threshold, and the level of the accident can be determined based on the degree of the excess.

While the accident measure plan can be established by the manager in person and input to the plant control server 200, the augmentation reality providing server 300 may automatically make the accident measure plan by referring to the type of the sensing data and the accident level.

For example, when the temperature measured by the temperature sensor 250-n exceeds 20% of the threshold 80°. the accident measure plan can automatically prepare the site inspection. When the temperature measured by the temperature sensor 250-n exceeds 80% of the threshold 80°. the accident measure plan can automatically prepare the site inspection with the safety equipment put on.

Meanwhile, the plant control server 200 sends an accident measure command to the mobile device 100 of the facility inspector (S470). The mobile device 100 receiving the accident measure command displays an emergency message (S480) and provides accident information to the facility inspector (S490).

The accident information provided in S490 includes 1) the location of the sensor detecting the accident, 2) the sensing data, 3) the accident measure plan, and so on.

Next, the mobile device 100 guides the location of the sensor detecting the accident to the facility inspector using the augmentation reality (S490). S490 includes the following procedures.

1) The mobile device 100 commences the photographing and generates a real image.
2) The mobile device 100 measures its current location by receiving a GPS signal.
3) The mobile device 100 sends the measured current location to the augmentation reality providing server 300.
4) The augmentation reality providing server 300 sends to the mobile device 100, a) the location, b) the detailed information, and c) the check list of the sensors around the received location.
5) Using the sensor information received from the augmentation reality providing server 300, a virtual image of the sensors is generated.
6) The virtual image overlaps the photographed real image.
7) The real image with the virtual image overlapped is displayed.

When the facility inspector inputs accident measure details through the mobile device 100 after completing the accident measure (S500), the mobile device 100 forwards the accident measure details input in S500 to the plant control server 200 (S510).

The plant control server 200 stores the accident measure details received in S510 to the DB (S520). The accident measure details stored in S520 can be searched and checked later.

FIGS. 3A through 3H are diagrams of Graphical User Interfaces (GUIs) provided when the plant facility management application installed to the mobile device 100 is executed.

Figure 3A:
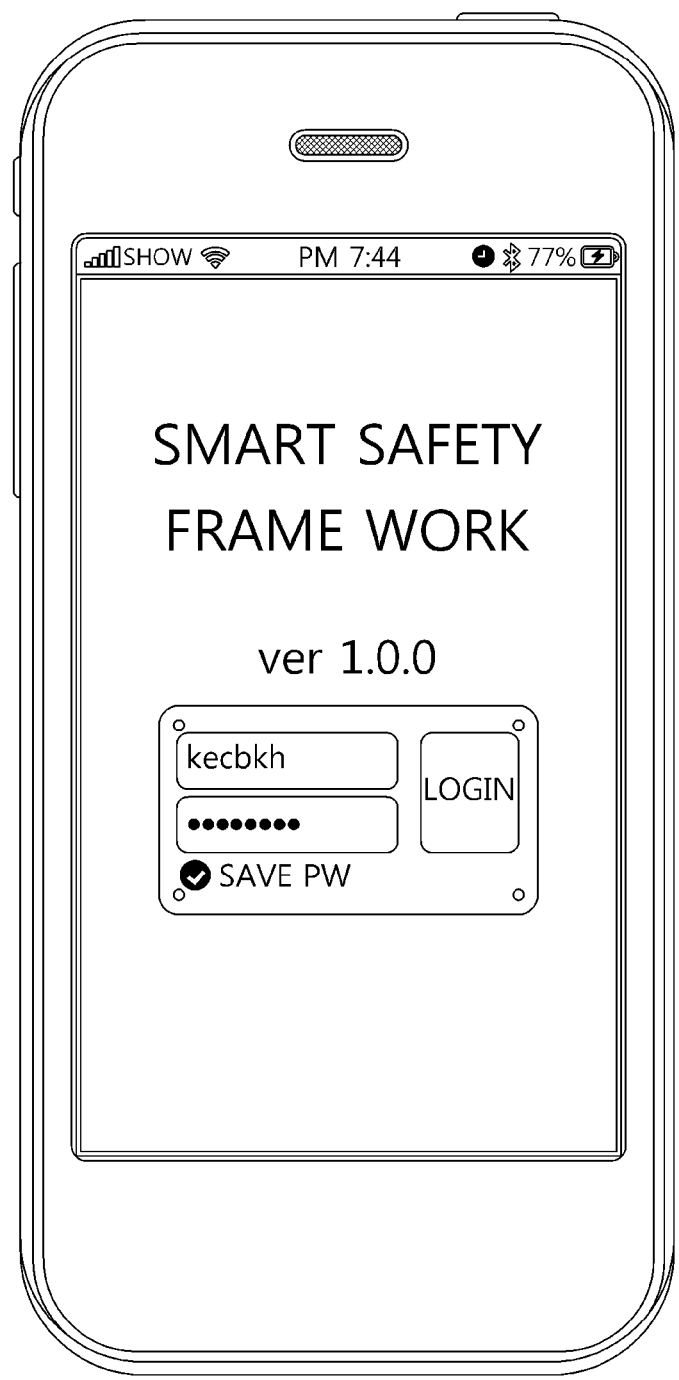
FIGS. 3A through 3H are diagrams of GUIs provided when a plant facility management application installed to a mobile device is executed.
Figure 3B:
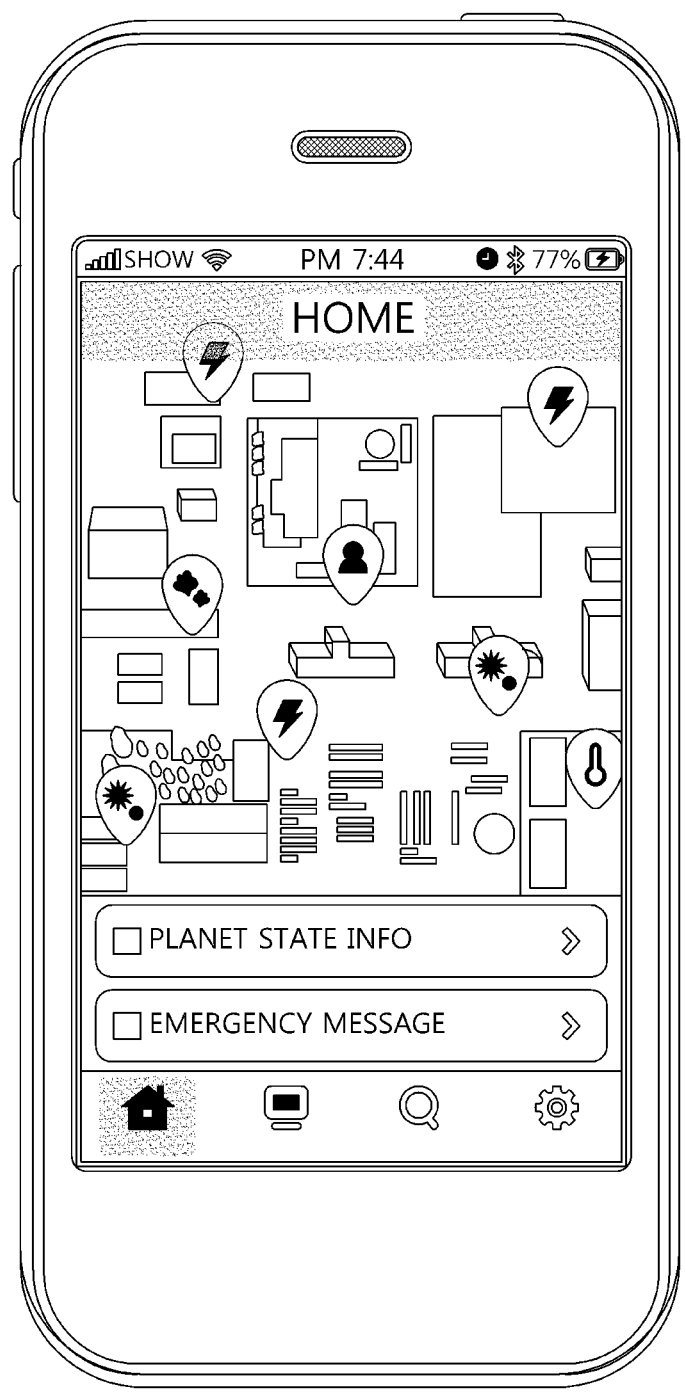

FIG. 3A shows a log-in screen when the plant facility management application is initially executed, and FIG. 3B shows a guide screen of the sensors in the plant after the log-in.

Figure 3C:
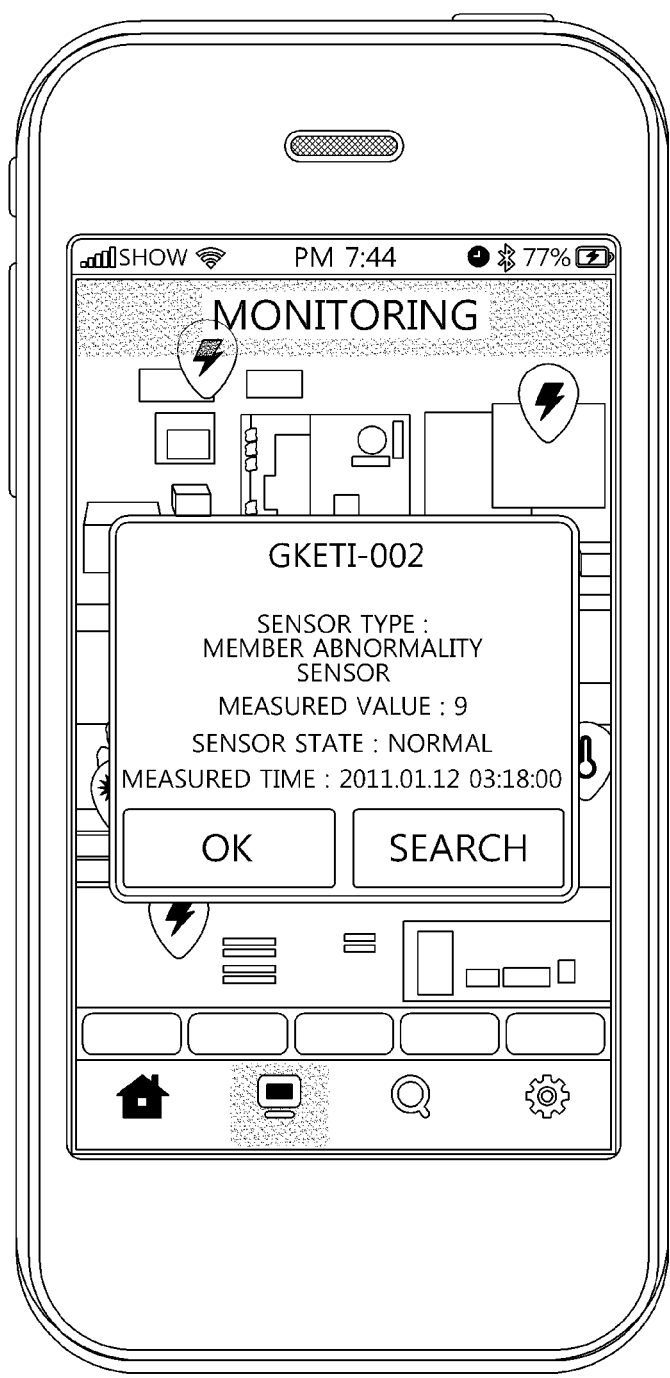
Figure 3D:
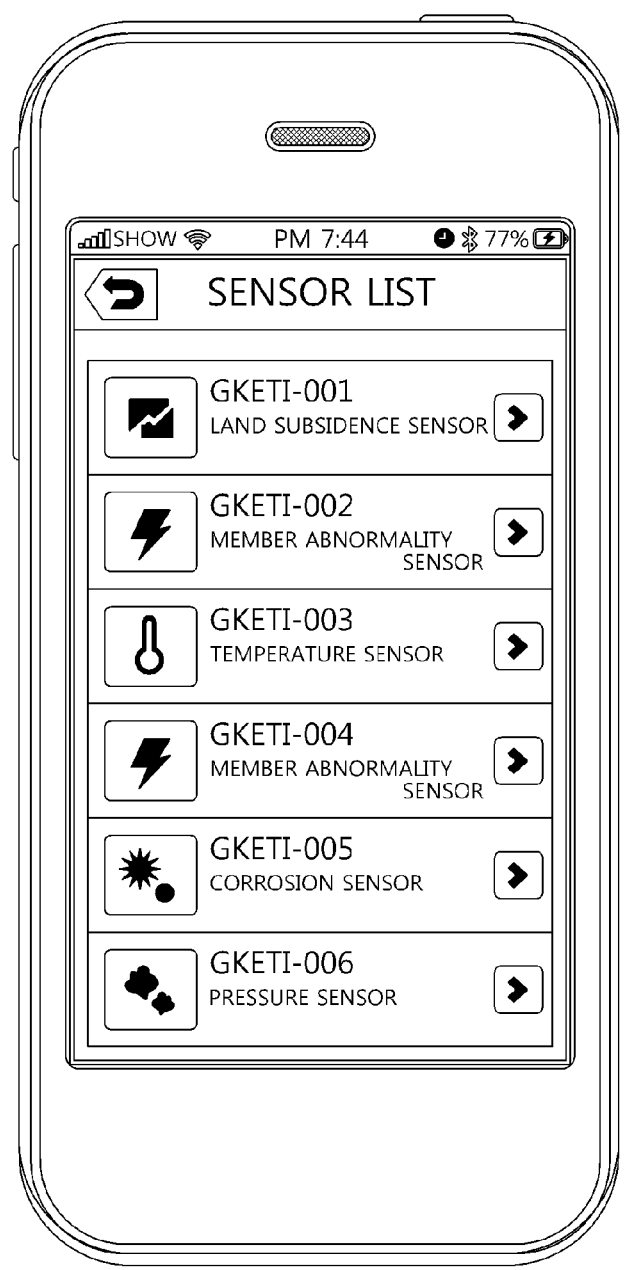

FIG. 3C shows a pop-up screen for guiding the detailed information of the sensor selected in the screen of FIG. 3B, and FIG. 3D shows a screen of a list of the sensors in the plant.

Figure 3E:
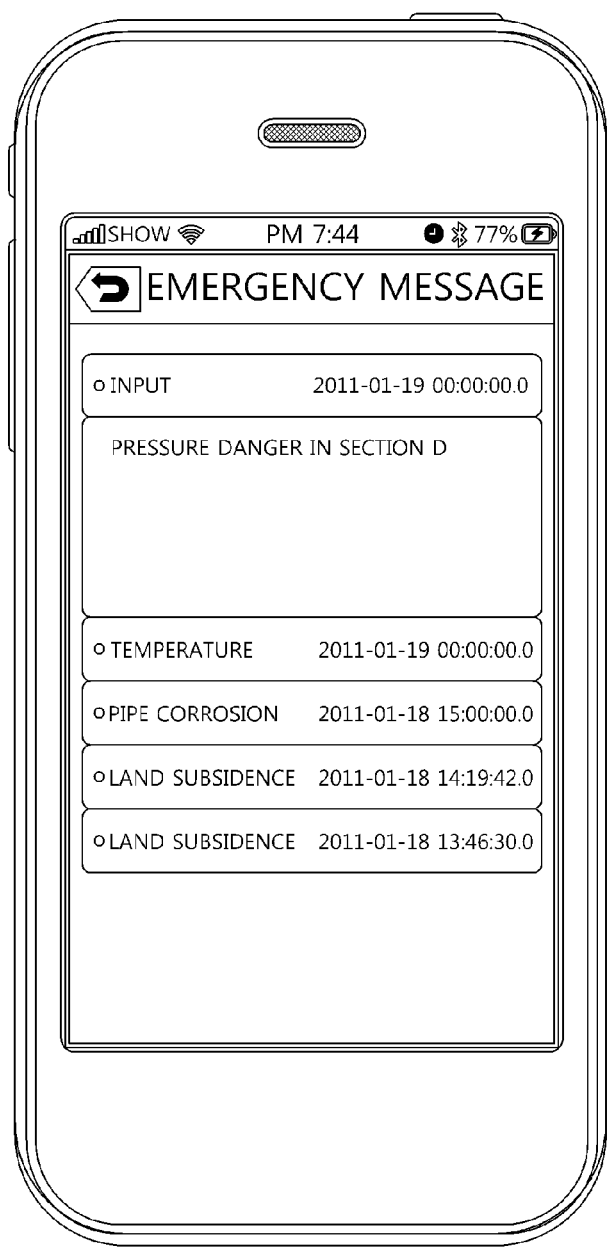
Figure 3F:
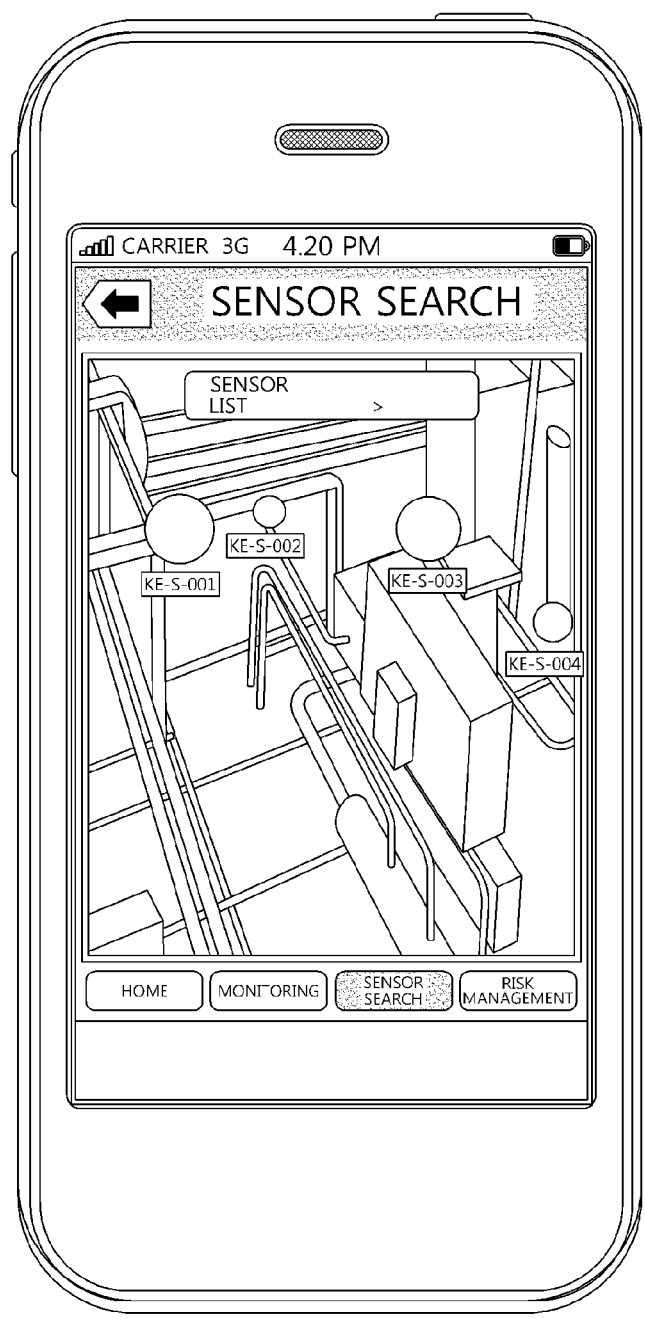
Figure 3G:
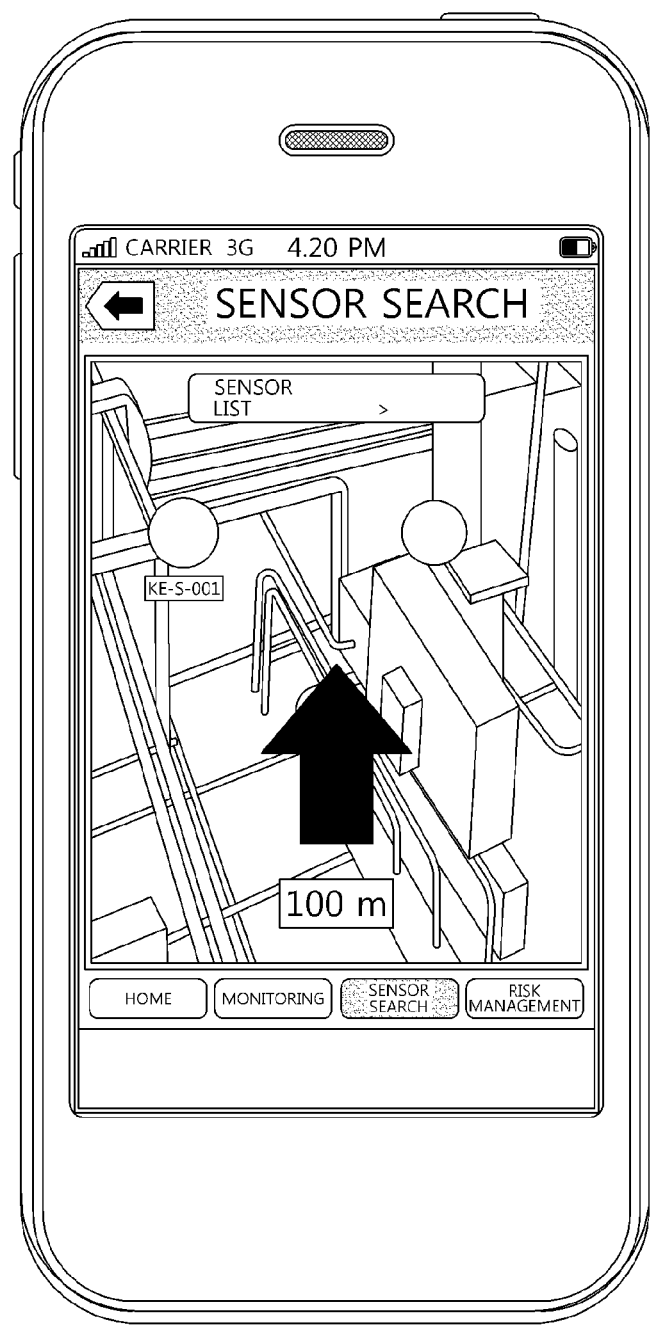

FIG. 3E shows a screen of the emergency message displayed in S490 of FIG. 2, and FIGS. 3F and 3G show screens for guiding the location of the sensor which detects the accident using the augmentation reality.

The sensors in the virtual image in the screens of FIGS. 3F and 3G can be represented differently (e.g., in different colors or different patterns) according to their type.

In addition, the sensor detecting the accident can be represented differently (e.g., in a different color or different pattern) from the sensor not detecting the accident.

Figure 3H:
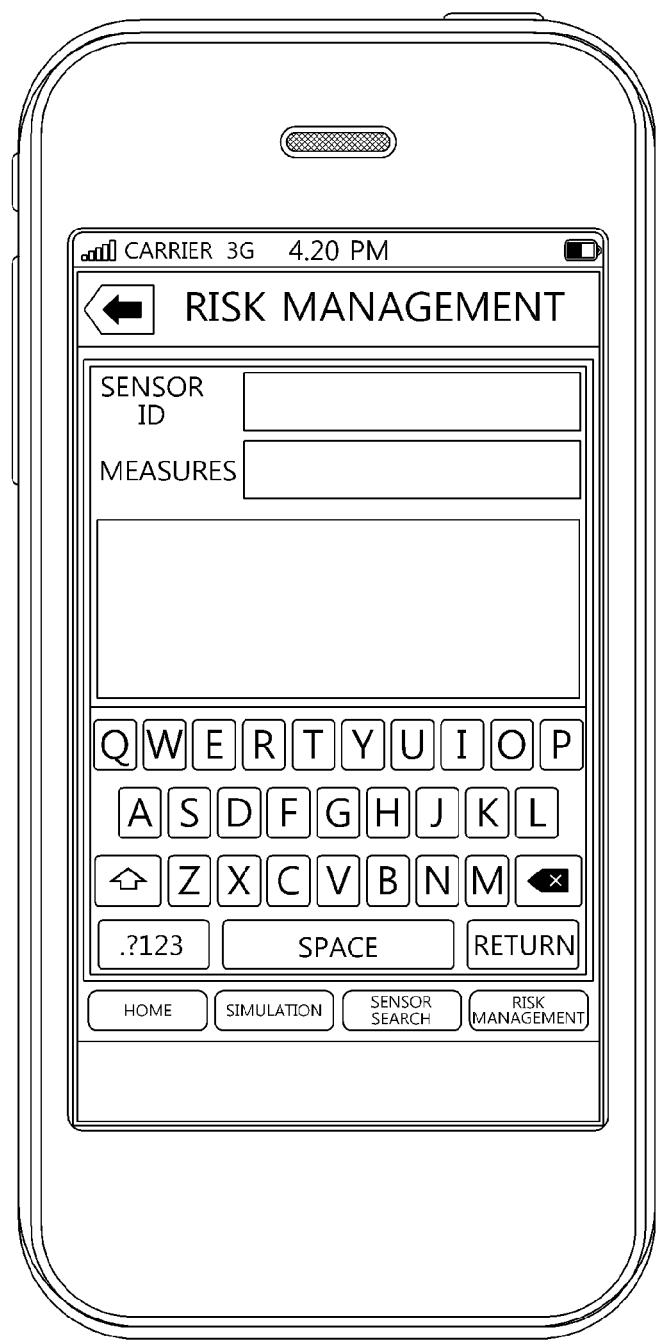

FIG. 3H shows an accident measure detail input screen usable in S500 of FIG. 2.

Figure 4:
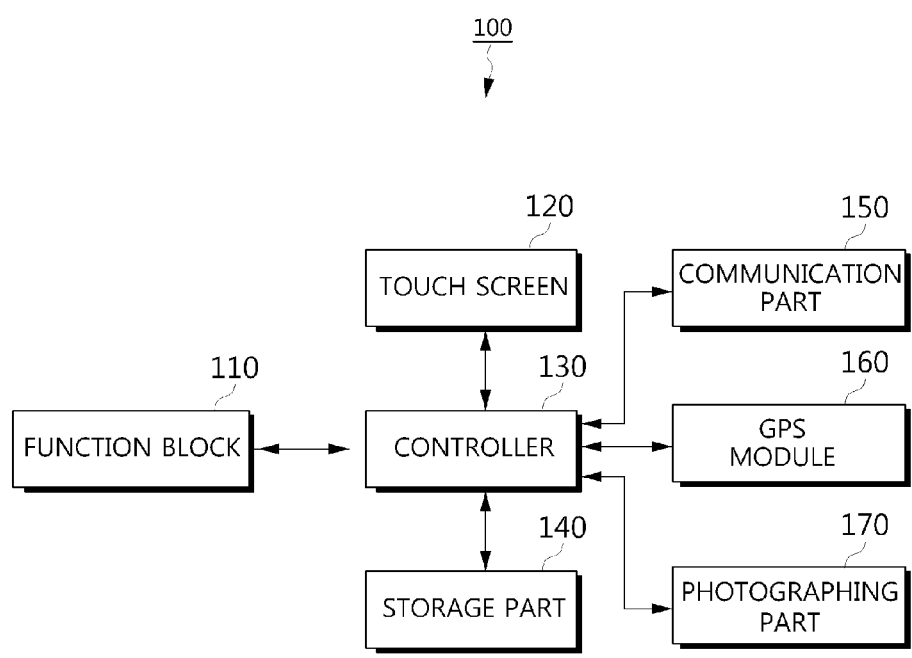
FIG. 4 is a detailed block diagram of the mobile device of FIG. 1.

FIG. 4 is a detailed block diagram of the mobile device 100 of FIG. 1. As shown in FIG. 4, the mobile device 100 includes a function block 110, a touch screen 120, a controller 130, a storage part 140, a communication part 150, a GPS module 160, and a photographing part 170.

The function block 110 carries out the proper functions of the mobile device 100. When the mobile device 100 is a mobile phone, the function block 110 performs a phone conversation, an SMS, and so on. When the mobile device 100 is a tablet PC, the function block 110 performs the computing function.

The touch screen 120 functions as a display showing the execution screens of FIGS. 3A through 3H, and as an input means for receiving the command through the touch.

The storage part 140 provides a storage space for storing the plant facility management application and the information received from the plant control server 200 and the augmentation reality providing server 300 as aforementioned.

The communication part 150 communicates with the plant control server 200 and the augmentation reality providing server 300 over the communication network. The GPS module 160 is a module for measuring the current location by receiving the GPS signal from a GPS satellite.

The photographing part 170 generates the real image by photographing the facilities in the plant. The controller 130 controls the operations of the mobile device 100. In particular, the controller 130 controls the components of the mobile device 100 to carry out the operations of the mobile device 100 among the steps of FIG. 2.

So far, the plant facility management method and system have been explained in detail according to the exemplary embodiments of the present invention. In the above exemplary embodiments, the locations of the sensors are provided using the augmentation reality to ease the understanding. It is noted that some other facilities to check than the sensors can be provided using the augmentation reality.

As set forth above, by displaying the facilities in the plant using the augmentation reality, the facility having a problem can be detected and accessed more easily.

Since the facility inspector always carries and uses the mobile device such as smart phone or tablet PC, the portability can be maximized Further, the facility inspector can enhance the work efficiency thanks to the more intuitive GUI using the augmentation reality, and the accident measure details can be immediately stored to the server.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing a plant management screen by a mobile device of a plant facility management system, the method comprising:
    photographing, by the mobile device, facilities in a plant;
    overlapping, by the mobile device, a virtual image indicating facilities to be checked and a real image captured in the photographing operation, wherein the virtual image is displayed to represent a facility having a problem differently from a facility having no problem, and the virtual image is generated, by the mobile device, based on sensor information received from an augmentation reality providing server;
    displaying, by the mobile device, the real image with the virtual image overlapped;
    displaying, by the mobile device, an accident measure plan required for the problem,
    wherein the accident measure plan is automatically generated by the augmentation reality providing server without a user input and provided from the augmentation reality providing server to the mobile device via a plant control server, and
    wherein the accident measure plan is generated by referring to a type of sensing data and an accident level;
    when the problem is detected and a sensing data value exceeds a threshold value, determining the accident level based on a degree by which the sensing data value exceeds the threshold value; and
    displaying, by the mobile device, a guide to a location of a sensor detecting the problem of the facility by using the overlapped image,
    wherein the guide includes a direction and a distance to the location of the sensor detecting the problem from a current location of the mobile device.

2. The method of claim 1, wherein the overlapping operation comprises:
    determining a current location of the mobile device;
    obtaining, from the augmentation reality providing server, information of the facilities to be checked around the current location, wherein the facilities are in the plant;
    generating the virtual image based on the information of the facilities to be checked; and
    overlapping the virtual image generated in the generating operation and the real image.

3. The method of claim 1, wherein the virtual image differently represents the facilities to be checked according to types of facilities.

4. The method of claim 1, further comprising:
    receiving measure details for the accident measure plan from a user; and
    transmitting the measure details from the mobile device to the plant control server of the plant facility management system.

5. The method of claim 4, further comprising:
    storing the measure details to a database of the plant control server, wherein the database is searchable and checkable.

6. The method of claim 1, wherein each of the facilities to be checked is a sensor that provides the sensor information to the plant control server.

7. The method of claim 1, wherein the accident measure plan is generated, when a value measured by a sensor exceeds 20% of the threshold value, as a plan for preparing a site inspection; and
    generated, when a value measured by a sensor exceeds 80% of the threshold value, as a plan for preparing a site inspection with a safety equipment.

8. A non-transitory computer-readable recording medium containing a program for causing, when executed by a mobile device, the mobile device to perform a method for providing a plant management screen, the method comprising:
    photographing, by the mobile device, facilities in a plant;
    overlapping, by the mobile device, a virtual image indicating facilities to be checked and a real image captured in the photographing operation, wherein the virtual image is displayed to represent a facility having a problem differently from a facility having no problem, and the virtual image is generated, by the mobile device, based on sensor information received from an augmentation reality providing server;
    displaying, by the mobile device, the real image with the virtual image overlapped;
    displaying, by the mobile device, an accident measure plan required for the problem,
    wherein the accident measure plan is automatically generated by the augmentation reality providing server without a user input and provided from the augmentation reality providing server to the mobile device via a plant control server,
    wherein the accident measure plan is generated by referring to a type of sensing data and an accident level;
    when the problem is detected and a sensing data value exceeds a threshold value, determining the accident level based on a degree by which the sensing data value exceeds the threshold value; and
    displaying a guide to a location of a sensor detecting the problem of the facility by using the overlapped image,
    wherein the guide includes a direction and a distance to the location of the sensor detecting the problem from a current location of the mobile device.

* * * * *